(12) United States Patent
Biasiotto et al.

(10) Patent No.: US 7,232,180 B2
(45) Date of Patent: Jun. 19, 2007

(54) SUSPENSION SYSTEM FOR A TRUCK CAB

(75) Inventors: Marco Biasiotto, Turin (IT); Francesco Butera, Turin (IT); Stefano Alacqua, Rivoli Cascine Vica (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 11/325,305

(22) Filed: Jan. 5, 2006

(65) Prior Publication Data

US 2006/0261639 A1  Nov. 23, 2006

(30) Foreign Application Priority Data

May 18, 2005  (EP) .................................. 05425338

(51) Int. Cl.
*B62D 24/04* (2006.01)
(52) U.S. Cl. ........................ 296/190.07; 296/190.05; 180/89.14

(58) Field of Classification Search ........... 296/190.07, 296/190.05, 190.04, 35.1; 180/89.13, 89.14
See application file for complete search history.

(56) References Cited

U.S. PATENT DOCUMENTS

| 4,735,272 | A | * | 4/1988 | Sjostrom et al. .......... 180/89.14 |
| 5,967,597 | A | | 10/1999 | Vander Kooi et al. |
| 6,070,681 | A | * | 6/2000 | Catanzarite et al. ..... 180/89.15 |
| 6,702,367 | B2 | * | 3/2004 | Leitner et al. ......... 296/190.07 |

FOREIGN PATENT DOCUMENTS

| EP | 1 070 872 A1 | 1/2001 |
| EP | 1 070 872 B1 | 1/2001 |
| EP | 1 125 831 | 8/2001 |
| EP | 1 380 768 | 1/2004 |

* cited by examiner

*Primary Examiner*—Jason Morrow
(74) *Attorney, Agent, or Firm*—Nixon & Vanderhye PC

(57) ABSTRACT

A suspension system for the cab of a lorry comprises a rotational damper preferably of a magneto-rheological type.

13 Claims, 5 Drawing Sheets

SUSPENSION SYSTEM FOR A TRUCK CAB

BACKGROUND OF THE INVENTION

The present invention relates to suspension systems for cabs of lorries, of the type comprising at least one arm mounted oscillating on the chassis of the lorry and connected to the structure of the cab, and elastic means and shock-absorbing means set operatively between the oscillating arm and the chassis of the lorry.

SUMMARY OF THE INVENTION

The purpose of the present invention is to provide a suspension system of the type referred to above that presents a simple and functional structure of reduced encumbrance, particularly in the vertical direction.

In order to achieve said purpose, the subject of the invention is a suspension system of the type specified above, characterized in that the aforesaid shock-absorbing means comprise a fluid rotational damper.

Preferably, the rotational damper is of the type which employs a magneto-rheological fluid and is provided with electronic-control means for generating a magnetic field that controls the degree of activation of the magneto-rheological fluid for the purpose of varying its apparent viscosity.

A rotational damper of the type referred to above has been illustrated in the European patent applications Nos. EP 1 070 872 and EP 1 380 768 filed of the name of the present applicant. Said rotational damper has a casing with an internal cavity, in which a blade piston defining two operative chambers in the cavity of the casing is mounted oscillating. Following upon a relative movement of the blade piston with respect to the casing, the fluid present in one of the two chambers is forced to pass into the other chamber through a passage made in the blade piston so as to obtain the damping effect. In said passage electrical-supply means are provided for generating a magnetic field in order to control the viscosity of the fluid.

The present invention is essentially based upon the idea of applying a rotational damper of the type referred to above in a suspension system for the cab of a lorry.

The cited European patent application No. EP 1 380 768 filed in the name of the present applicant likewise shows a suspension system for motor vehicles in which a rotational damper of the type referred to above is used, the casing of which is rigidly connected to an oscillating arm of the suspension, and the blade piston of which is instead rigidly connected to the structure of the vehicle. In said configuration, during operation, there occurs a movement of the entire casing of the damper with respect to the blade piston, which remains fixed. Furthermore, in said configuration, the oscillating arm also co-operates with the end of a leaf spring which constitutes the elastic element of the suspension.

Studies and experiments conducted by the present applicant have now surprisingly shown that the suspension system for a motor vehicle illustrated in the preceding proposal can be applied to a suspension system for the cab of a lorry, and the present invention intends to protect also said specific application.

In the preferred embodiment, the suspension system according to the invention comprises a front suspension and a rear suspension. The front suspension, once again in the case of the preferred embodiment, comprises a pair of longitudinal arms, which are mounted oscillating about one and the same axis transverse to the longitudinal direction of the vehicle and are connected at their free ends to the opposite ends of a transverse torsion bar. The structure of the cab of the lorry is mounted so that it can turn about said torsion bar to enable tipping-up of the cab in order to gain access to the engine set underneath. Each oscillating arm is rigidly connected to the blade piston of a respective rotational damper. Furthermore, the front suspension comprises a leaf spring set transverse to the longitudinal direction, with its central part anchored to the chassis of the motor vehicle and the opposite ends co-operating with the ends of the aforesaid two oscillating arms, underneath the latter.

The rear suspension has instead a configuration which substantially corresponds to that of the motor-vehicle suspension illustrated in the European patent application No. EP 1 380 768, with a pair of oscillating transverse arms mounted oscillating about two axes parallel to the longitudinal direction of the motor vehicle and each rigidly connected to the casing of a respective rotational damper, the blade piston of each damper being rigidly connected to the chassis of the motor vehicle. Also in this case, a leaf spring is provided, set transverse to the longitudinal direction of the motor vehicle, with its central part anchored to the chassis of the motor vehicle and the opposite ends co-operating with said oscillating transverse arms.

Thanks to the aforesaid characteristics, the cab of lorry is provided with a suspension system that is extremely simple and functional and, at the same time, has very reduced dimensions, particularly in the vertical direction.

BRIEF DESCRIPTION OF THE DRAWINGS

Further characteristics and advantages of the invention will emerge from the ensuing description with reference to the annexed plate of drawings, which are provided purely by way of non-limiting example and in which.

DETAILED DESCRIPTION OF THE INVENTION

Figure 1:
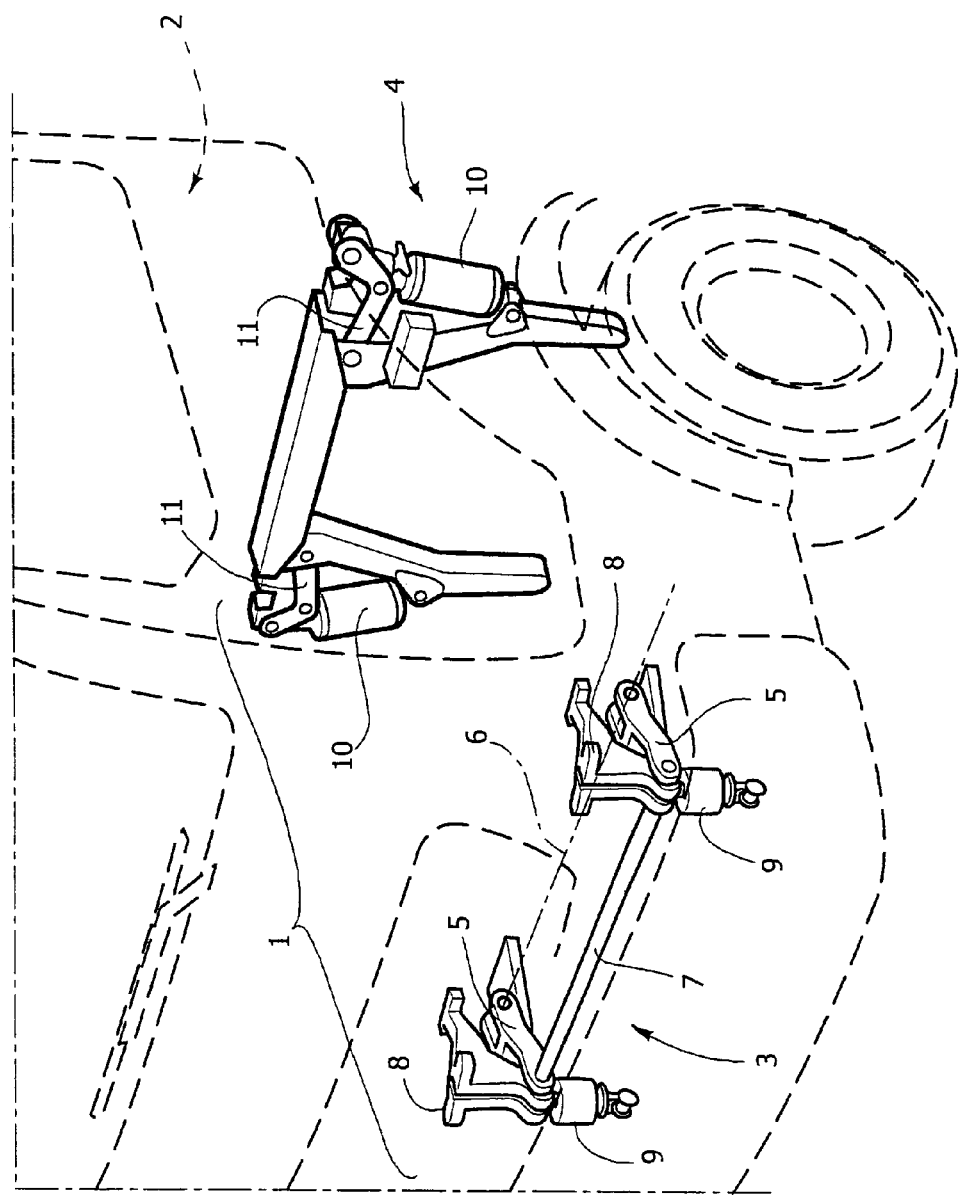
FIG. 1 is a schematic perspective view of a suspension system for the cab of a lorry according to the known art.

In FIG. 1, the reference number 1 designates a suspension system for the cab 2 of a lorry according to the known art. The suspension system 1 comprises a front suspension 3 and a rear suspension 4. The front suspension 3 comprises a pair of longitudinal oscillating arms 5 mounted oscillating about one and the same transverse axis 6, orthogonal to the vertical longitudinal plane of the motor vehicle. The free ends of the two oscillating arms 5 are connected to a transverse torsion bar 7, mounted on which so that they can rotate are two supports 8, rigidly connected to which is the structure of the cab, which can thus turn about the axis of the torsion bar 7. Said assembly enables raising of the cab by means of rotation about the axis of the torsion bar 7 when it is necessary to gain access to the engine set underneath the cab for maintenance operations. Operatively set between the free ends of the oscillating arms 5 and the chassis of the lorry are two spring-damper assemblies 9, which use cylindrical dampers. Once again with reference to the known solution, also the rear suspension 4 comprises two spring-damper assemblies 10 of a traditional type, with cylindrical dampers associated to two oscillating transverse arms 11.

Figure 2:
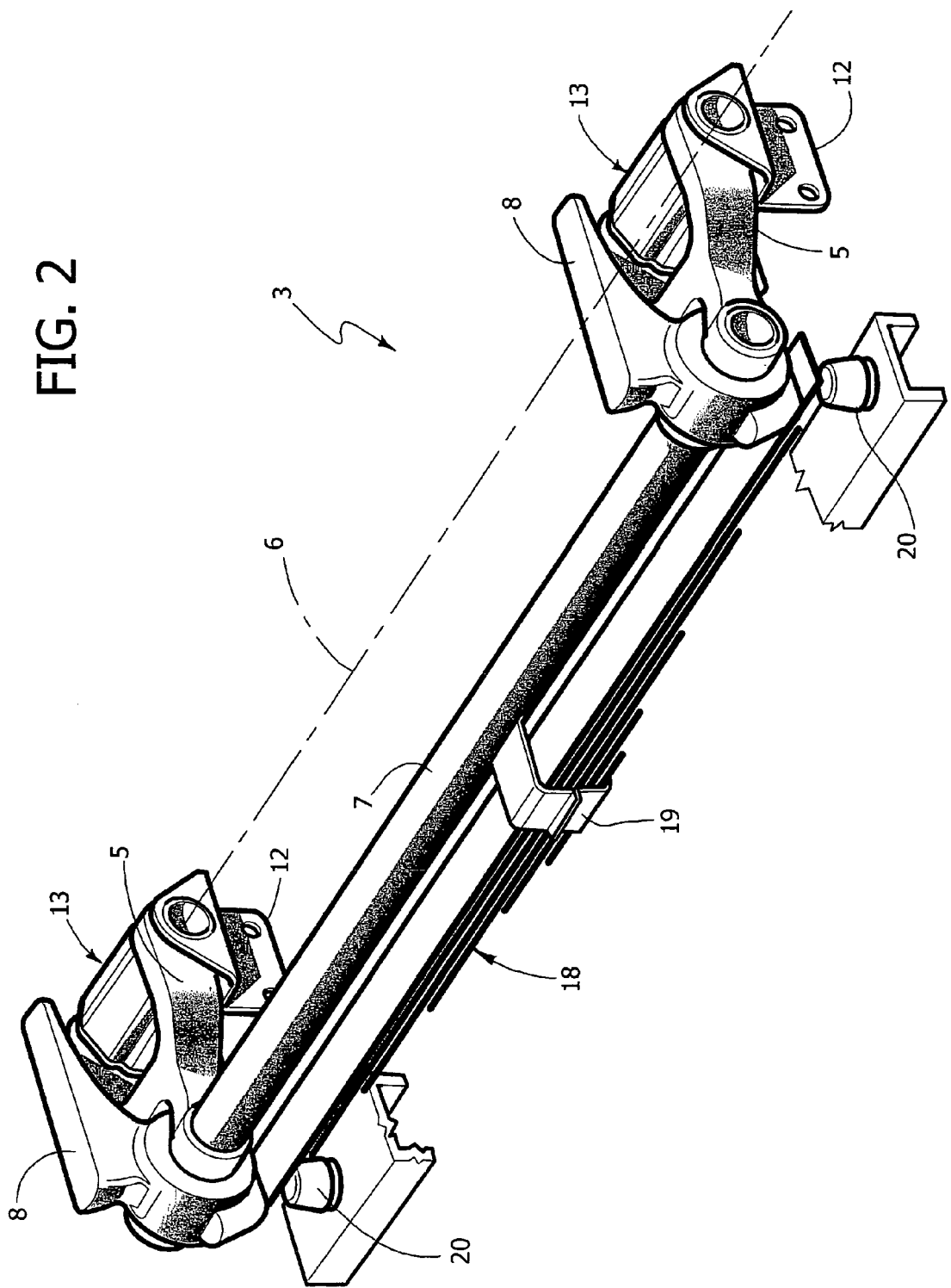
FIG. 2 is a perspective view of the front suspension of a preferred embodiment of the suspension system for the cab of a lorry according to the invention.
Figure 3:
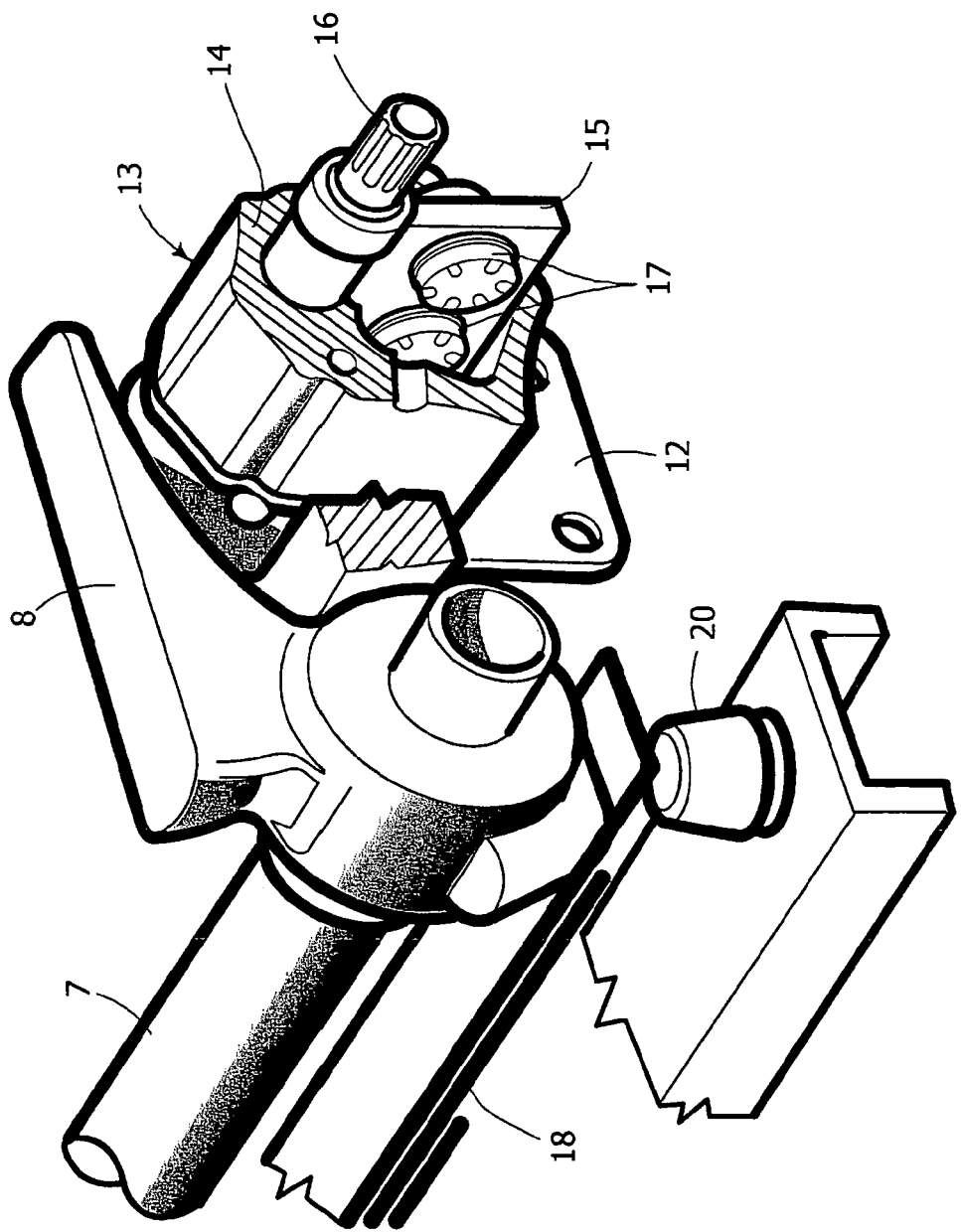
FIG. 3 is a perspective view at an enlarged scale and partially in cross-section of a detail of FIG. 2.

FIG. 2 illustrates a preferred embodiment of the front suspension forming part of the suspension system for the cab of a lorry according to the invention. In said figure, parts that are in common with those of FIG. 1 are designated by the same reference numbers. In the case of the invention, also the front suspension 3 comprises two longitudinal oscillating arms 5 mounted oscillating about the transverse axis 6 on brackets 12 rigidly connected to the chassis of the lorry. Also in this case, the ends of the oscillating arms 5, which are fork-shaped, are connected to the two opposite ends of a transverse torsion bar 7, mounted on the ends of which, so that they can turn, are the two supports 8 connected to the structure of the cab. The difference with respect to the known solution lies in the conformation of the shock-absorbing means and of the elastic means of the suspension. According to the invention, the shock-absorbing means are constituted by two rotational dampers 13, each of which has a casing 14 rigidly connected to the respective bracket 12 and a blade piston 15 mounted oscillating inside the casing and rigidly connected to a shaft 16, which is coupled in rotation with the respective oscillating arm 5. In this way, the oscillations of the oscillating arms 5 about the axis 6 bring about corresponding oscillations of the blade piston 15 inside the casing 14. The rotational damper 13 has a general configuration of the type described and illustrated in the preceding European patent applications cited above filed in the name of the present applicant. In particular, the blade piston 15 defines, inside the casing 13, two chambers that communicate with one another by means of passages through which the fluid contained inside the casing is forced to pass following upon the movements of the blade piston 15, thus bringing about the damping effect. Provided in a position corresponding to the passages present in the blade piston 15 are electrical-supply coils 17, which generate a magnetic field that affects the characteristics of the fluid contained inside the damper, which is a magneto-rheological fluid. An electronic control unit (not illustrated) controls electrical supply of said coils in such a way as to obtain the desired variations of viscosity of the fluid in the various operating conditions. Said advantage is added to the advantage deriving from the geometry of the rotational damper, which has a very reduced encumbrance, above all in the vertical direction, as compared to known systems.

The elastic means of the front suspension 3 are constituted by a leaf spring 18, which is anchored centrally by means of an attachment 19 to the chassis of the lorry and has opposite ends the top surfaces of which co-operate with the bottom surfaces of the supports 8 carried by the oscillating arms 5.

A support made of elastomeric material 20 is fixed to the chassis of the lorry in a position corresponding to each end of the leaf spring 18, with a function of bottom limit stop of the respective end of the leaf spring 18.

Figure 4:
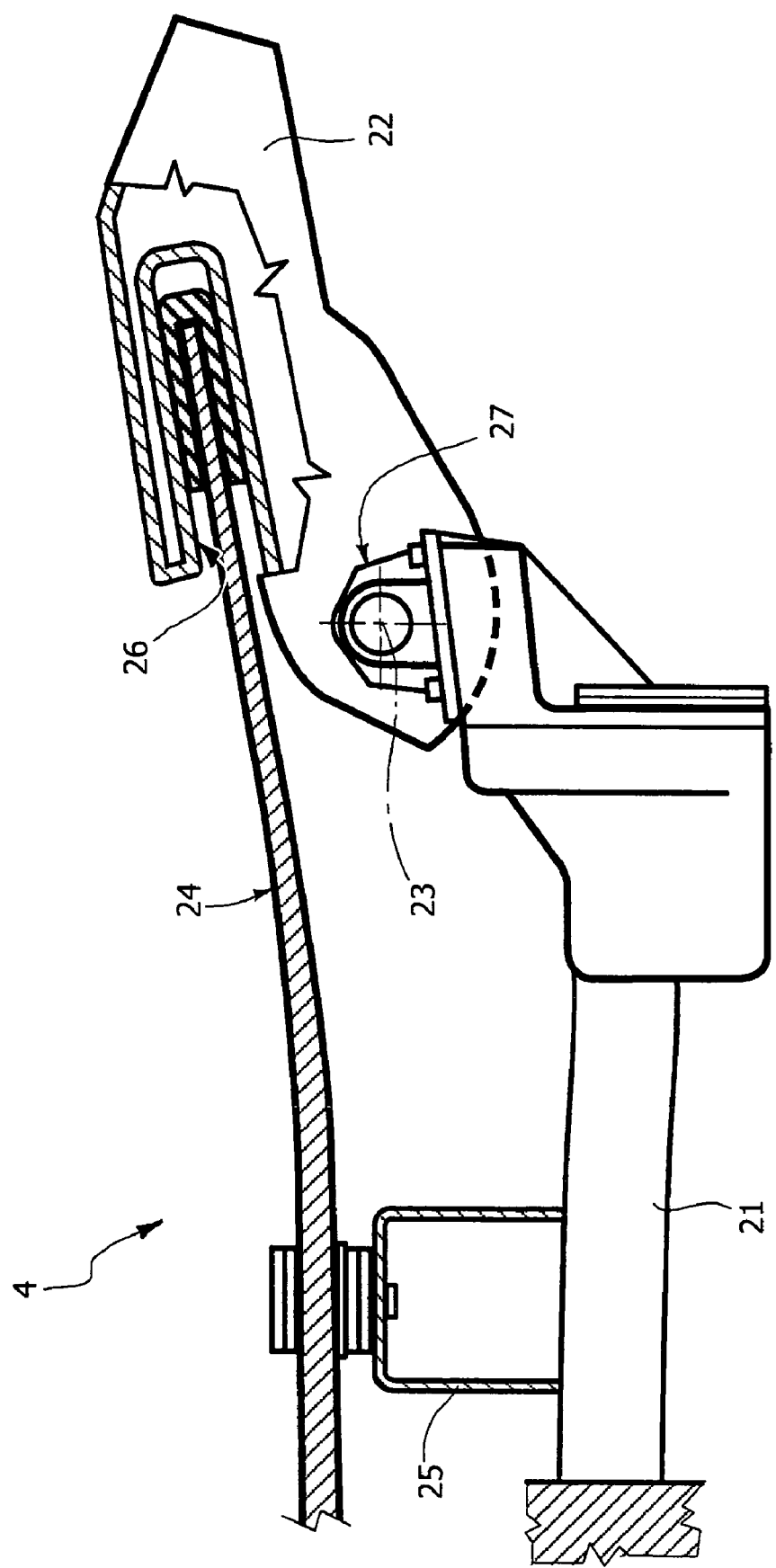
FIG. 4 is a cross-sectional view of the rear suspension of the suspension system according to the preferred embodiment of the invention, in a transverse plane with respect to the longitudinal direction of the motor vehicle.

FIG. 4 is a schematic illustration of the configuration of the rear suspension in the preferred embodiment of the suspension system for the cab of a lorry according to the invention. Said configuration basically corresponds to the suspension system for motor vehicles illustrated in the European patent application EP 1 380 768 filed in the name of the present applicant. In this case, a chassis is provided, which includes a cross member 21, which extends in a direction orthogonal to the longitudinal vertical plane of the motor vehicle, and carries at each end an oscillating transverse arm 22. The arm 22 oscillates about an axis 23 parallel to the longitudinal direction of the motor vehicle and co-operates with the suspended structure of the cab of the lorry. It further co-operates with the end of a leaf spring 24, which is set transverse to the longitudinal direction, is anchored centrally to the chassis 21 by means of supports 25, and is received at each end in a pocket 26 made in the structure of the oscillating arm 22. The oscillating arm 22 is rigidly connected to the casing of a respective rotational magneto-rheological damper 27. The oscillating blade piston of the damper 27 is instead rigidly connected to a shaft fixed to the chassis 21. Consequently, the oscillations of each transverse oscillating arm 22 cause an oscillation of the entire casing of the respective damper 27 with respect to its blade piston, which remains fixed. Also in this case, of course, the damper is of the magneto-rheological type and has a blade piston provided with electronically controlled coil means for generating a magnetic field which affects the characteristics of viscosity of the fluid.

As may be seen, in the preferred embodiment, both the front suspension and the rear suspension of the system for the cab of a lorry use a rotational damper of a magneto-rheological type to the advantage of the simplicity and reduced overall dimensions of the structure, and also with the consequent possibility of affecting the behaviour of the suspension to obtain optimal characteristics in any condition of operation of the motor vehicle.

The invention can in theory be applied also to the front suspension only, or else to the rear suspension only of the suspension system of the cab.

Figure 5:
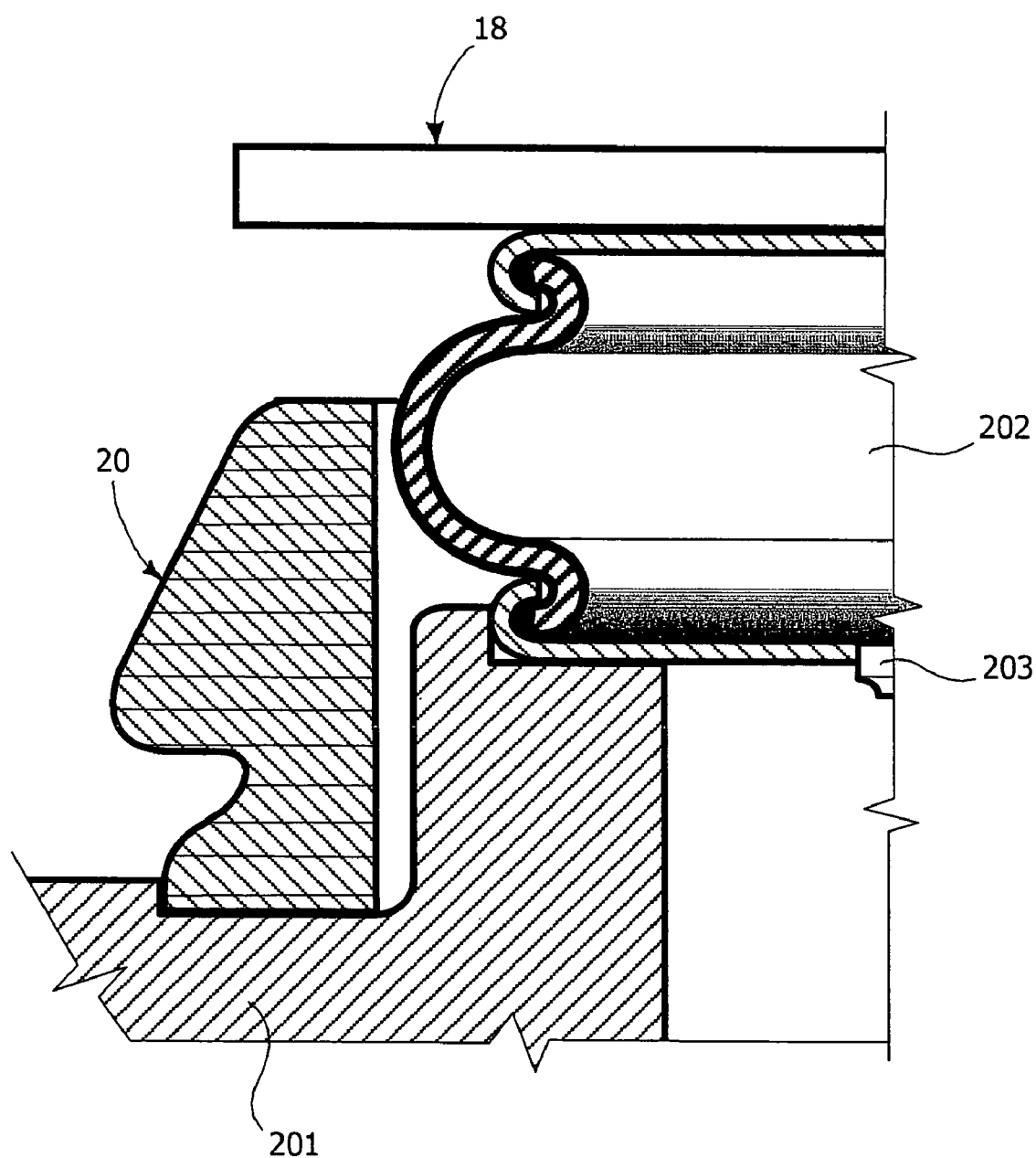
FIG. 5 shows a variant of a detail of FIG. 2.

FIG. 5 shows a variant of the invention. Current suspensions for the cabs of lorries present the possibility of regulating the static orientation of the cab by controlling the pressure of the air springs on which the cab is suspended. In the case of the embodiment illustrated in FIG. 2, this function would no longer be present in so far as the air springs of the known art are replaced by the leaf spring. To overcome this drawback, in the solution of FIG. 5, the rebound bumper 20 is mounted on the structure 201 of the vehicle in parallel to an air spring 202 (in actual fact, it could be just one component which embraces the two functions), which is set between the structure 201 and the leaf spring 18. The reference number 203 designates the inlet for the air, connected to a compressed-air system. Said solution enables recovery of the variations of cab orientation resulting from the presence of one or more persons in the cab or, more in general, to any variation of weight that entails variation in the static orientation of the cab. The addition of this component does not jeopardize the normal behaviour of the rebound bumper, spring and damper but simply enables the cab to maintain, in different conditions of static load, a constant height from the ground. The system is regulated by one or more cab-position sensors (not represented), the signal of which is sent to an electronic control unit, which controls the pressure of the air in the springs 202.

Of course, without prejudice to the principle of the invention, the details of construction and the embodiments may vary widely with respect to what is described and illustrated herein, without thereby departing from the scope of the present invention.

For example, the dampers 13 could have the casing connected to the oscillating arm and the blade piston connected to the fixed structure, whilst the dampers 27 could have the casing connected to the fixed structure and the blade piston connected to the oscillating arm. Furthermore, each of the leaf springs illustrated above could be replaced by two half-leaf springs, arranged in a transverse direction or longitudinal direction or in any other way.

What is claimed is:

1. A suspension system for the cab of a lorry or truck vehicle comprising:
   at least one arm mounted oscillating on a chassis of the lorry or truck and connected to the structure of the cab; and
   elastic means and shock-absorbing means operatively set between the oscillating arm and the chassis of the lorry or truck,
   said system wherein said shock-absorbing means comprise a fluid rotational damper,
   wherein said rotational damper is of the type that uses a magneto-rheological fluid, comprising: an external casing; a blade piston mounted oscillating in the cavity inside the casing, which defines two operative chambers that communicate with one another through passages made in the blade piston,
   wherein the aforesaid elastic means are constituted by a leaf spring having a part for attachment to the chassis of the vehicle and an end co-operating with said oscillating arm,
   wherein the system comprises a front suspension and a rear suspension, at least one of which being provided with the aforesaid rotational damper,
   wherein the front suspension comprises a pair of longitudinal arms mounted oscillating about one and the same axis transverse to the longitudinal direction of the vehicle, and connected at their free ends to the opposite ends of a transverse torsion bar, the structure of the cab of the vehicle being mounted so that it can turn about said torsion bar to enable tipping-up of the cab, each oscillating arm being rigidly connected to the blade piston of a respective rotational damper, and said leaf spring being set transverse to the longitudinal direction, with its central part anchored to the chassis of the vehicle and the opposite ends co-operating with the ends of the two oscillating arms underneath the latter.

2. The suspension system according to claim 1, wherein the rear suspension comprises a pair of oscillating transverse arms, mounted oscillating about two axes parallel to the longitudinal direction of the motor vehicle and each rigidly connected to the casing of a respective rotational damper, the blade piston of each damper being rigidly connected to the chassis of the vehicle, said leaf spring being set transverse to the longitudinal direction of the vehicle, with its central part anchored to the chassis of the vehicle and opposite ends co-operating with said oscillating transverse arms.

3. A suspension system for a cab of a lorry or truck vehicle comprising:
   at least one arm mounted oscillating on a chassis of the lorry or truck and connected to the structure of the cab; and
   elastic means and shock-absorbing means operatively set between the oscillating arm and the chassis of the lorry or truck,
   said system wherein said shock-absorbing means comprise a fluid rotational damper,
   wherein said rotational damper is of the type that uses a magneto-rheological fluid, comprising: an external casing; a blade piston mounted oscillating in the cavity inside the casing, which defines two operative chambers that communicate with one another through passages made in the blade piston;
   wherein the aforesaid elastic means are constituted by a leaf spring having a part for attachment to the chassis of the vehicle and an end co-operating with said oscillating arm,
   wherein set between said leaf spring and the structure of the vehicle is at least one air spring for control of the orientation of the cab.

4. A suspension system for a cab of a lorry or truck vehicle comprising:
   at least one arm mounted oscillating on a chassis of the lorry or truck and connected to the structure of the cab; and
   elastic means and shock-absorbing means operatively set between the oscillating arm and the chassis of the lorry or truck,
   said system wherein said shock-absorbing means comprise a fluid rotational damper, and
   wherein the cab is mounted on the chassis of the truck so that it can be raised by rotation around an axis transverse to the longitudinal direction of the lorry or truck to a position enabling access to an engine arranged under the cab,
   wherein said rotational damper is of the type that uses a magneto-rheological fluid, comprising: an external casing: a blade piston mounted oscillating in the cavity inside the casing, which defines two operative chambers that communicate with one another through passages made in the blade piston,
   wherein the aforesaid elastic means are constituted by a leaf spring having a part for attachment to the chassis of the vehicle and an end co-operating with said oscillating arm,
   wherein it comprises a front suspension and a rear suspension, at least one of which being provided with the aforesaid rotational damper, and
   wherein the front suspension comprises a pair of longitudinal arms mounted oscillating about one and the same axis transverse to the longitudinal direction of the vehicle, and connected at their free ends to the opposite ends of a transverse torsion bar, the structure of the cab of the vehicle being mounted so that it can turn about said torsion bar to enable tipping-up of the cab, each oscillating arm being rigidly connected to the blade piston of a respective rotational damper, and said leaf spring being set transverse to the longitudinal direction, with its central part anchored to the chassis of the vehicle and the opposite ends co-operating with the ends of the two oscillating arms underneath the latter.

5. The suspension system according to claim 4, wherein the rear suspension comprises a pair of oscillating transverse arms, mounted oscillating about two axes parallel to the longitudinal direction of the motor vehicle and each rigidly connected to the casing of a respective rotational damper, the blade piston of each damper being rigidly connected to the chassis of the vehicle, said leaf spring being set transverse to the longitudinal direction of the vehicle, with its central part anchored to the chassis of the vehicle and opposite ends co-operating with said oscillating transverse arms.

6. The suspension system according to claim 4, wherein set between said leaf spring and the structure of the vehicle is at least one air spring for control of the orientation of the cab.

7. A truck or lorry vehicle comprising:
   a chassis,
   a cab mounted on the chassis of the truck or lorry so that it can be raised by rotation around an axis transverse to the longitudinal direction of the vehicle to a position enabling access to an engine arranged under the cab, and
   a suspension interposed between the chassis and the cab, wherein said suspension comprises:

at least one arm mounted oscillating on a chassis of the truck or lorry and connected to a structure of the cab;

elastic means and shock-absorbing means operatively set between the oscillating arm and the chassis of the truck or lorry, and wherein said shock-absorbing means comprise a fluid rotational damper.

8. The truck or lorry vehicle according to claim 7, wherein said rotational damper is of the type that uses a magneto-rheological fluid, comprising: an external casing; a blade piston mounted oscillating in the cavity inside the casing, which defines two operative chambers that communicate with one another through passages made in the blade piston;

9. The truck or lorry vehicle according to claim 8, wherein the aforesaid elastic means are constituted by a leaf spring having a part for attachment to the chassis of the vehicle and an end co-operating with said oscillating arm.

10. The truck or lorry vehicle according to claim 9, wherein it comprises a front suspension and a rear suspension, at least one of which being provided with the aforesaid rotational damper.

11. The truck or lorry vehicle according to claim 10, wherein the front suspension comprises a pair of longitudinal arms mounted oscillating about one and the same axis transverse to the longitudinal direction of the vehicle, and connected at their free ends to the opposite ends of a transverse torsion bar, the structure of the cab of the vehicle being mounted so that it can turn about said torsion bar to enable tipping-up of the cab, each oscillating arm being rigidly connected to the blade piston of a respective rotational damper, and said leaf spring being set transverse to the longitudinal direction, with its central part anchored to the chassis of the vehicle and the opposite ends co-operating with the ends of the two oscillating arms underneath the latter.

12. The truck or lorry vehicle according to claim 10, wherein the rear suspension comprises a pair of oscillating transverse arms, mounted oscillating about two axes parallel to the longitudinal direction of the motor vehicle and each rigidly connected to the casing of a respective rotational damper, the blade piston of each damper being rigidly connected to the chassis of the vehicle, said leaf spring being set transverse to the longitudinal direction of the vehicle, with its central part anchored to the chassis of the vehicle and opposite ends co-operating with said oscillating transverse arms.

13. The truck or lorry vehicle according to claim 9, wherein set between said leaf spring and the structure of the vehicle is at least one air spring for control of the orientation of the cab.

* * * * *